Sept. 11, 1934.   U. WEDGE   1,973,274

METHOD OF MIXING PAINT OR THE LIKE

Filed July 29, 1930

WITNESS:
Robt R Ketchel

INVENTOR
Utley Wedge
BY
Augustus B Stoughton
ATTORNEY.

Patented Sept. 11, 1934

1,973,274

UNITED STATES PATENT OFFICE 1,973,274

METHOD OF MIXING PAINT OR THE LIKE

Utley Wedge, Paoli, Pa.

Application July 29, 1930, Serial No. 471,536

2 Claims. (Cl. 259—10)

The principal object of the present invention is to provide for mixing paint and the like at comparatively little expense and yet satisfactorily.

The invention comprises the improvements to be presently described and finally claimed.

Figure 1:
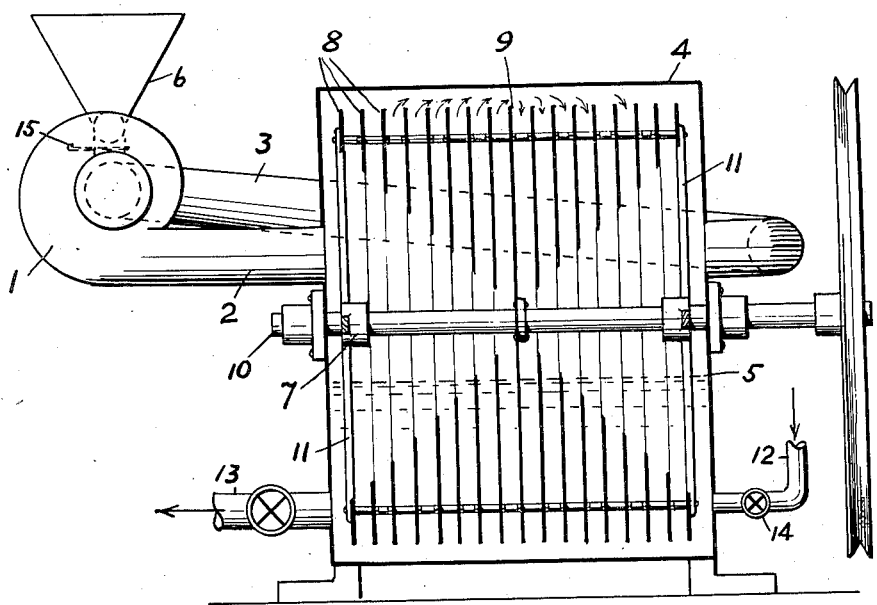
Figure 2:
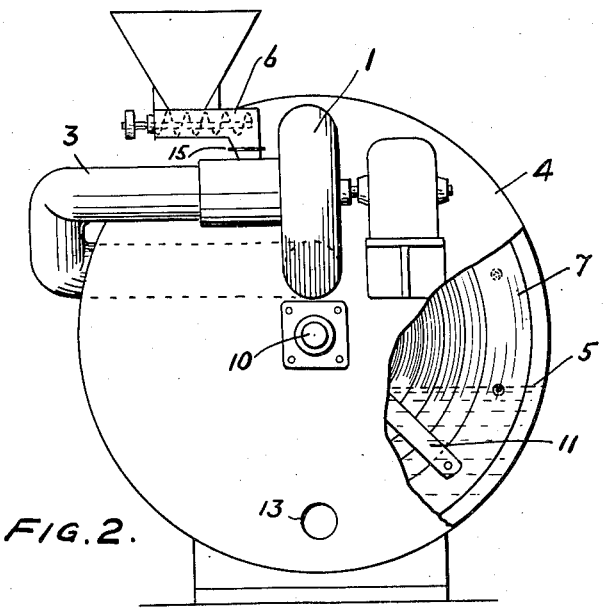

In the following description reference will be made to the accompanying drawing forming part hereof and in which Figure 1 is an elevational view, principally in section, and Fig. 2 is an end view of the apparatus shown in Fig. 1 with parts broken away.

In the drawing 1 is an apparatus for producing a current of air of sufficient velocity to carry dust and cause it to impinge on a moist surface. Referring to Figs. 1 and 2, this apparatus is shown as a blower having return connections 2 and 3 which include a closed chamber 4 containing a supply of vehicle of which the level is indicated at 5. 6 is a means for feeding pulverulent pigment or pigment dust into the closed path so as to be re-circulated therein by the air current from and back to the blower. 15 is valve means for regulating the supply of pigment dust. 7 is a rotary element arranged in the closed chamber and dipping into the vehicle and receiving films of the vehicle and presenting them in the path of the pulverulent pigment. As indicated, the rotating element includes a series of spaced rings 8 of gradually increasing internal diameter and of which the center one, 9, may extend to the shaft 10 of the rotating element, and of which the others are carried by spiders 11. 12 indicates an inlet connection for vehicle, shown as provided with a valve 14, and 13 is an outlet connection for paint.

In use the vehicle is presented in the form of films upon the extended surface of the moving element, and pigment dust is blown in a closed path in which the films are interposed to receive particles of pigment.

The proportions of paint dust and vehicle may be controlled, regulated and varied for example by means of the valve devices 14 and 15.

It will be obvious to those skilled in the art to which the invention relates that modifications may be made in details of construction, arrangement and procedure without departing from the spirit of the invention which is not limited to such matters or otherwise than the prior art and the appended claims may require.

I claim:

1. The process of mixing paint which comprises establishing a pool of liquid vehicle, the liquid in said pool being free to flow in all directions at the bottom of said pool, drawing up films of said vehicle, impinging pigment dust upon said films so that some of the dust is caught by the films, recirculating in a closed air path the pigment dust which is not caught by the films so that the pigment dust is again impinged on the films, and dipping the films after an impingement of the pigment dust in the pool of vehicle so that the films of vehicle are rearranged.

2. The process of mixing paint which comprises establishing a pool of liquid vehicle, the liquid in said pool being free to flow in all directions at the bottom of said pool, drawing up films of said vehicle, impinging pigment dust upon said films so that some of the dust is caught by the films, recirculating in a closed air path part of which is in parallel portions in the same direction across the surfaces of said films, the pigment dust which is not caught by the films so that the pigment dust is again impinged on the films, and dipping the films after an impingement of the pigment dust in the pool of vehicle so that the films of vehicle are rearranged.

UTLEY WEDGE.